Patented Mar. 26, 1935

1,995,553

UNITED STATES PATENT OFFICE 1,995,553

PROCESS OF PREPARING AZODYESTUFFS

Richard Stüsser, Cologne-Deutz, Germany, assignor to General Aniline Works, Inc., New York, N. Y., a corporation of Delaware No Drawing. Application November 10, 1932, Serial No. 642,126. In Germany November 13, 1931

6 Claims. (Cl. 260—94)

The present invention relates to a process of preparing azodyestuffs capable of yielding heavy metal complex compounds.

It is known from the literature that azodyestuffs which are characterized by having hydroxy groups in the o·o'-positions to at least one azo group, or an amino group or an alkyl- or aryl-substituted amino group and a hydroxy group, or a carboxylic acid or carbonyl group and a hydroxy group or amino group which may likewise be substituted by alkyl or aryl groups, or which contain in the molecule a hydroxy group and a carboxylic acid group in o-position to each other can be transformed into heavy metal compounds containing the heavy metal in a complex form. As heavy metals combining with azodyestuffs to form complex compounds there may be mentioned by way of example, lead, bismuth, cadmium, copper, zinc, chromium, nickel, cobalt, iron, manganese and the like.

In accordance with my present invention azodyestuffs capable of yielding heavy metal complex compounds are prepared by starting with the corresponding azodyestuffs containing a heavy metal in a complex form and removing said heavy metal by treating the dyestuff with an agent capable of combining with the heavy metal attached to the azodyestuff in a complex form.

The specific method of removing the heavy metal from the azodyestuff depends on the specific heavy metal to be removed. As a general rule may be stated that there come into consideration all those methods generally used in analytical chemistry for isolating heavy metals; for example, the heavy metal may be precipitated in form of a difficultly soluble compound, or the heavy metal complex compound of the azodyestuff may be treated with a suitable compound yielding a complex compound with the heavy metal and having a stronger affinity to said heavy metal than the azodyestuff; or finally, in some cases the heavy metal attached to the azodyestuffs in a complex form can be split off by treating the dyestuff with an acid.

The first method referred to above for producing azodyestuffs free from a heavy metal containing the same in a complex form consists in precipitating the heavy metal as a difficultly soluble compound, preferably in form of a sulfide, for example, by treating the azodyestuff in suspension or solution with hydrogen sulfide in acid solution, or with a suitable sulfide in alkaline solution.

When working in acid solution, for example, in hydrochloric acid solution, there can be precipitated from the dyestuffs all those metals known in analytical chemistry as hydrogen sulfide group, such as copper, lead, cadmium, while, when working in alkaline solution, either in caustic alkaline-, in bicarbonate- or in carbonate solution, there can be precipitated generally those metals known in analytical chemistry as ammonium sulfide group. In this manner, for example, iron, manganese, nickel, cobalt, and also metals of the hydrogen sulfide group, may be precipitated, while chromium which does not form a stable sulfide cannot be precipitated as a sulfide. The preferred agent of precipitating heavy metals according to this method is sodium sulfide, it being self-understood that other sulfides may be used with the same result.

When precipitating the heavy metals as sulfides by means of hydrogen sulfide or a salt thereof it should be borne in mind that hydrogen sulfide is a strong reducing agent and that in subjecting such dyestuffs which contain groups liable to undergo reduction, especially the nitro group, these groups are reduced by the hydrogen sulfide.

As stated above the heavy metals may be further removed from the azodyestuffs by treating the dyestuffs with a compound, yielding a complex compound with the heavy metal and having a stronger affinity to the same than the azodyestuff, such compounds are for example, organic polyhydroxy compounds, especially acids, such as oxalic acid, tartaric acid and citric acid. In this manner, for example, chromium and copper can be removed.

The third method referred to above consists in treating the heavy metal complex compounds of the azodyestuffs with a strong acid, for example, with a concentrated or aqueous dilute sulfuric or hydrochloric acid or also with formic acid. The temperatures required somewhat depend upon the concentration of the acid used in such a manner that lower concentrations require higher temperatures, and vice versa. Thus, for example, when using an aqueous sulfuric acid, such as a 30% sulfuric acid, generally heating is necessary, for example, at a temperature between about 75° C. and about the boiling point of the reaction mixture. A preferred method of performing the process consists in introducing the heavy metal containing azodyestuffs into concentrated sulfuric acid of room temperature, wherein the dyestuff dissolves with the splitting off of the heavy metal. According to this method chromium, copper, lead, iron, nickel, cobalt and the like can be removed.

According to my new process there are obtainable azodyestuffs capable of yielding heavy metal complex compounds which are not obtainable or only difficultly obtainable according to other methods. Thus, for example, the o-hydroxyazodyestuff according to the following Example 1 cannot be prepared by coupling 1 molecular proportion of diazotized 4-chloro-2-amino-1-hydroxybenzene with 1 molecular proportion of 2-hydroxynaphthalene-6.8-disulfonic acid, because diazotized 4-chloro-2-amino-1-hydroxybenzene cannot be coupled with 2-hydroxynaphthalene-6.8-disulfonic acid. This dyestuff can be prepared with advantage by methylating the hydroxy group in the 4-chloro-2-amino-1-hydroxybenzene. The methylether of this o-hydroxydisazodyestuff of the following constitution:

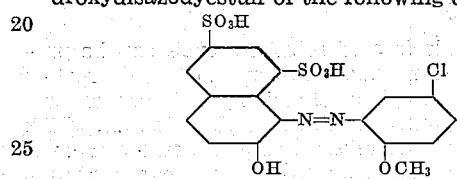

is transformed by coppering, with splitting up the methoxy group, into the copper complex compound of the probable formula:

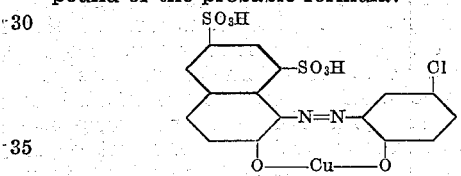

and this copper complex compound is then transformed into the technical valuable water soluble o-hydroxyazodyestuff free from metal according to the process described in Example 1.

Also in cases the o-hydroxyamino compounds, for example, 3.3'- dihydroxy - 4.4'- diaminodiphenyl, are difficultly accessible, it is of advantage to start with the corresponding alkylethers or acyl compounds. Up to date the splitting up of the alkoxy groups in azodyestuffs is preferably achieved by transforming the said alkoxy azodyestuffs into heavy metal complex compounds. According to the invention the heavy metal being attached to the azodyestuff in a complex form is removed, whereby the hydroxy-azodyestuffs corresponding to the starting alkoxy-azodyestuffs are obtained. Further the o-hydroxydiazo compounds have only a small ability to coupling, and for this reason it is in some cases of advantage to employ the better coupling alkoxy compounds, the corresponding dyestuffs otherwise being either not obtainable or only with a small yield. The splitting up of the alkoxy groups is then performed by treating with metal compounds, whereby the metal complex compounds are produced. Then, these metal complex compounds are again transformed into the azodyestuffs free from heavy metals according to the process described.

Dyestuffs capable of yielding metal complex compounds are of especially technical value if the dyestuffs containing metal are insoluble in water, the dyestuffs free from metal, however, are easily watersoluble and have a good affinity for the fibre. The dyestuff free from metal is dyed on the fibre, and the dyeing is then aftertreated with metal compounds, whereby the insoluble metal complex compound is produced yielding a fast dyeing on the fibre.

The invention is illustrated by the following examples, without being limited thereto:

Example 1.—10 grams of the lead compound of the azosalicylic acid having the following constitution:

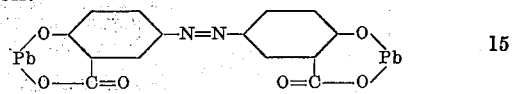

are suspended in water and boiled with 8 grams of sodium sulfide for a short time, whereby the lead is precipitated in form of lead sulfide. After filtering, the dyestuff free from metal is precipitated by acidifying the filtrate with hydrochloric acid. The dyestuff is filtered and dried. It dyes wool yellowish shades which by after-chroming on the fibre yield darker yellow shades of good fastness to light and fulling.

Instead of the lead compounds also the corresponding manganese, iron, cobalt, nickel, zinc, cadmium or bismuth compounds may be used; in this case the metals may be precipitated in form of sulfides. Also by heating with hydrochloric acid the metals can be removed from the complex compounds; in this case the dyestuff is precipitated and the metals dissolve in form of hydrochlorides. The precipitated dyestuff is filtered, washed, dissolved in aqueous soda solution and salted out by the addition of common salt.

Example 2.—10 grams of the complex copper compound of the o-hydroxyazodyestuff having the following formula:

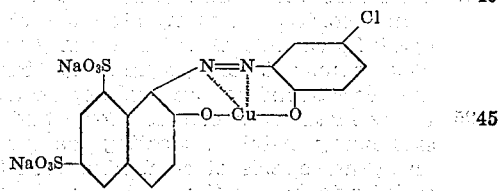

are boiled with 10 grams of sodium sulfide in 1 litre of water for a short time, whereby the reddish-brown coloration of the copper compound turns to violet. When the dyestuff has been dissolved, the mixture is filtered and the precipitated copper sulfide remains on the filter. The filtrate contains the dyestuff free from metal which is isolated by salting out and acidifying. The o-hydroxy-azodyestuff free from metal is a brown powder which can be dyed on the fibre. By after-treating the dyeing with chromium compounds reddish-violet shades of good fastness to light and fulling are obtained.

Example 3.—20 grams of the complex copper compound, prepared by coppering the azodyestuff from 1 molecular proportion of tetrazotized 3.3'-dimethoxy-4.4'-diaminodiphenyl and 2 molecular proportions of β-naphthyl-3-methyl-5-pyrazolone-8'-sulfonic acid of the following formula:

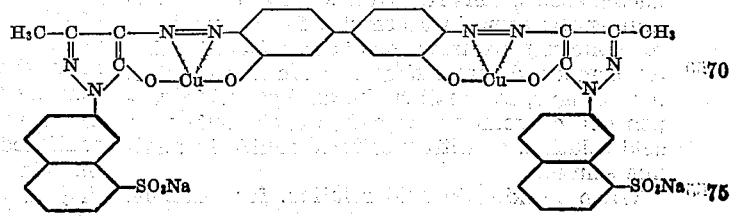

are heated in 1 litre of water with 5 cc. of aqueous caustic soda lye of 38° Bé. and 10 grams of crystallized sodium sulfide, until the coloration of the solution does no more change. After filtering the precipitated copper sulfide, the dyestuff is isolated from the mixture. The o-hydroxydisazodyestuff free from metal is soluble in water and dyes cotton, silk and viscose yellowish-red shades, which by after-coppering yield Bordeaux red shades of good fastness properties.

*Example 4.*—20 grams of the complex chromium compound to the o-hydroxyazodyestuff from 1 molecular proportion of diazotized 5-nitro-2-amino-1-hydroxybenzene and 1 molecular proportion of 2-aminonaphthalene-6-sulfonic acid are stirred, while cooling, in 200 cc. of sulfuric acid of 66° Bé. for a short time, until a test becomes bluish-red when adding aqueous caustic soda. Then the mixture is poured onto ice, and the precipitated dyestuff is filtered and washed with water. The o-hydroxyazodyestuff is a dark powder, being soluble in aqueous alkalies with a bluish-red coloration. From an acid bath the dyestuff dyes wool bluish-red shades which by after-chroming can be transformed into green shades of good fastness to light.

*Example 5.*—10 grams of the copper compound of the disazodyestuff from 1 molecular proportion of tetrazotized 4.4'-diaminodiphenyl-3.3'-dicarboxylic acid, 1 molecular proportion of 2-phenylamino-5-hydroxynaphthalene-7-sulfonic acid and 1 molecular proportion of 1-hydroxynaphthalene-5-sulfonic acid are suspended in hot water and boiled with 10 grams of crystallized sodium sulfide. Thereby the difficultly soluble copper compound is transformed into the easily soluble dyestuff free from metal, while the copper precipitates in form of copper sulfide. After filtering the copper sulfide, the dyestuff free from metal is salted out from the filtrate. It is a dark powder, soluble in water with a violet-blue coloration and dyeing cotton bluish-violet shades, which by after-chroming yield blue dyeings of good fastness properties.

In an analogous manner the copper can be removed by means of mineral acids, such as hydrochloric acid and sulfuric acid, or organic acids, such as oxalic acid and formic acid.

I claim:

1. The process which comprises reacting upon an azodyestuff containing a heavy metal in a complex form in solution or suspension with an agent splitting off the heavy metal from the azodyestuff and binding said heavy metal.

2. The process which comprises reacting upon an azodyestuff having hydroxy groups in the o.o'-positions to at least one azo group containing a heavy metal in a complex form in solution or suspension with an agent splitting off the heavy metal from the azodyestuff and binding said heavy metal.

3. The process which comprises reacting upon an azodyestuff containing a heavy metal of the group consisting of copper and chromium in a complex form in solution or suspension with an agent splitting off the heavy metal from the azodyestuff and binding the heavy metal.

4. The process which comprises reacting upon an azodyestuff having hydroxy groups in the o.o'-positions to at least one azo group containing a metal of the group consisting of copper and chromium in a complex form in solution or suspension with an agent splitting off the heavy metal from the azodyestuff and binding the heavy metal.

5. The process which comprises reacting upon an azodyestuff having hydroxy groups in the o.o'-positions to at least one azo group containing copper in a complex form in aqueous alkaline solution or suspension with sodium sulfide.

6. The process which comprises reacting upon an azodyestuff having hydroxy groups in the o.o'-positions to at least one azo group containing a metal of the group consisting of copper and chromium in a complex form with an acid of the group consisting of highly concentrated hydrochloric or sulfuric acid.

RICHARD STÜSSER.